United States Patent
Mammone et al.

(10) Patent No.: US 12,555,585 B2
(45) Date of Patent: Feb. 17, 2026

(54) PULSE-CODE MODULATED AUDIO ROUTER

(71) Applicant: BlackBerry Limited, Waterloo (CA)

(72) Inventors: Joe Mammone, Kanata (CA); Darrin Kenneth John Fry, Kanata (CA)

(73) Assignee: BlackBerry Limited, Ontario (CA)

( * ) Notice: Subject to any disclaimer, the term of this patent is extended or adjusted under 35 U.S.C. 154(b) by 256 days.

(21) Appl. No.: 18/348,053

(22) Filed: Jul. 6, 2023

(65) Prior Publication Data

US 2025/0014583 A1  Jan. 9, 2025

(51) Int. Cl.
*G10L 19/005* (2013.01)
*G10L 19/008* (2013.01)
*H04H 60/04* (2008.01)

(52) U.S. Cl.
CPC .......... *G10L 19/005* (2013.01); *G10L 19/008* (2013.01); *H04H 60/04* (2013.01)

(58) Field of Classification Search
CPC ..... G10L 19/00; G10L 19/167; G10L 19/002; G10L 19/173; G10L 19/20; G10L 19/18; G10L 19/22; G10L 19/24; G10L 19/005; G10L 19/008; G10L 21/003; G10L 21/007; G10L 21/01; G10L 21/013; G10L 2021/0135; G10L 21/038; G10L 21/0388; G10L 21/043; G10L 21/045; G10L 21/047; G10L 21/049; G10L 21/055; G10L 25/15; G10L 25/18; G10L 25/24; G10L 25/48; G10L 25/60; G10L 25/66; G10L 25/75; G10L 25/72; G11B 20/10527; G11B 2020/10546; G11B 2020/10574; G11B 2020/10564; G11B 2020/10583; G11B 2020/10944; G11B 2020/10953; G11B 2020/10962; G11B 2020/10972; G11B 20/20; G11B 20/22; G11B 20/225;

(Continued)

(56) References Cited

U.S. PATENT DOCUMENTS

2006/0233078 A1* 10/2006 Terada ................ G11B 27/329
2015/0131815 A1   5/2015 Butters
(Continued)

FOREIGN PATENT DOCUMENTS

EP  4167580 A1 * 4/2023 ............. G06F 3/162

OTHER PUBLICATIONS

EPO: Extended European Search Report relating to EP application No. 24186375.2, dated Oct. 14, 2024.

*Primary Examiner* — Leshui Zhang
(74) *Attorney, Agent, or Firm* — Conley Rose, P.C.; J. Robert Brown, Jr.

(57) ABSTRACT

Methods and systems for dynamically routing pulse-code modulated (PCM) audio subchannels to one or more sink devices using a software-based router. The PCM router may set a pre-conversion buffer in the conversion path to a sink device for a particular subchannel if the source PCM fragment size differs from the sink fragment size. It may also compare characteristics of the audio subchannel to the sink device to identify a mismatch and, on that basis, configure the conversion path to include a sample rate converter, a channel converter, or a format converter, as needed. Subchannels can be dynamically routed to two or more sink devices and routing may be changed during playback.

20 Claims, 7 Drawing Sheets

(58) Field of Classification Search
CPC ..... G11B 20/24; G11B 27/3027; G11B 20/10; H04W 4/70; H04N 21/4305; H04N 21/4307; H04N 21/439; H04N 21/4392; H04N 21/4396; H04N 21/4398; H04N 21/44004; H03M 3/042; H04S 2400/13; G06F 3/165; G06F 3/162; G06F 3/16; H04H 60/04; H04J 3/0632
USPC ................ 704/500–504, 219, 203, 209, 212; 381/1–23
See application file for complete search history.

(56) References Cited

U.S. PATENT DOCUMENTS

| | | | |
|---|---|---|---|
| 2016/0044412 A1 | 2/2016 | Mackay et al. | |
| 2018/0035230 A1* | 2/2018 | Beack | H04S 5/00 |
| 2019/0222938 A1 | 7/2019 | Silverio | |
| 2020/0066291 A1* | 2/2020 | Mammone | G10L 19/26 |
| 2021/0098011 A1* | 4/2021 | George | G06F 3/162 |
| 2022/0366923 A1 | 11/2022 | Mammone et al. | |
| 2023/0297324 A1* | 9/2023 | Yu | H04N 21/4852 700/94 |

\* cited by examiner

PULSE-CODE MODULATED AUDIO ROUTER

FIELD

The present application generally relates to pulse-code modulated (PCM) audio and, in particular, to a software-implemented router to dynamically route PCM audio streams to one or more audio sink devices.

BACKGROUND

To play a PCM audio stream on a target device, such as a speaker or set of speakers, a client application needs to open and configure the target device for playback. If the application wants to re-route the stream to a different audio device, it closes the existing connection and opens and configures a connection to the new audio device. To target multiple devices at the same time, the client application needs to open and configure multiple connections and attempt to synchronously write data to each audio device, some of which may have inconsistent requirements in terms of format, number of channels, and/or sample rate, among other parameters. Not all client applications are adequately configured to handle this complexity.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
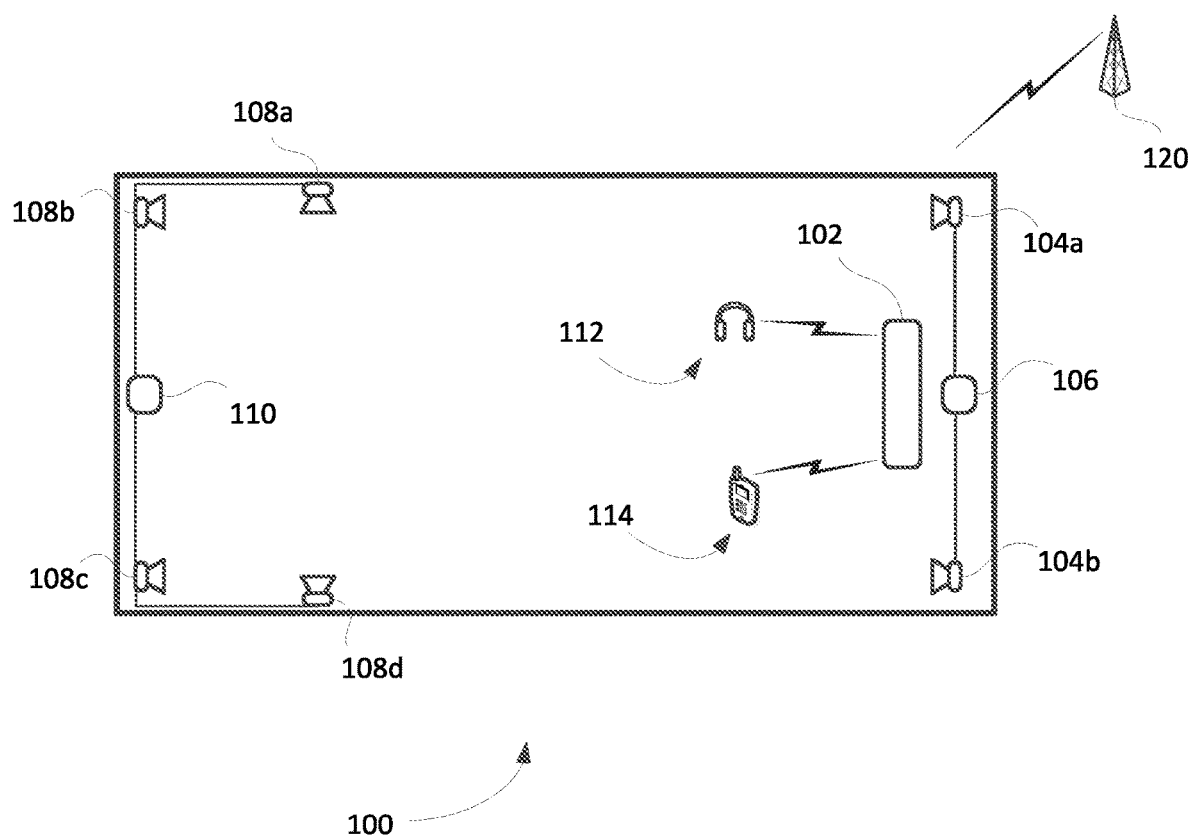
FIG. 1 shows an illustrative diagrammatic example of a vehicle that includes multiple audio sinks.

In a first aspect, the present application describes a computer-implemented method of dynamically routing pulse-code modulated (PCM) audio subchannels to one or more sink devices using a software-based router. The method may include determining that an audio subchannel is to be routed to a new sink device; determining that a source fragment size differs from a sink fragment size associated with the new sink device and, as a result, setting a pre-conversion buffer within the software-based router; comparing characteristics of the audio subchannel to the new sink device and, based on a mismatch, configuring a conversion path having one or more of a sample rate converter, a channel converter, or a format converter; and processing input PCM fragment data from the audio subchannel into the pre-conversion buffer and through the conversion path to a PCM buffer in the new sink device.

In some implementations, comparing includes determining that a source sample rate of the audio subchannel differs from a sink sample rate associated with the new sink device, and wherein configuring the conversion path includes instantiating the sample rate converter to convert the sample rate of the audio subchannel to match the sink sample rate.

In some implementations, comparing includes determining that the sink device is configured to output a different number of channels than the audio subchannel supplies, and wherein configuring includes instantiating the channel converter to convert the audio subchannel to the different number of channels.

In some implementations, comparing includes determining that the sink device is configured to process a different sample format than the audio subchannel provides, and wherein configuring the conversion path includes instantiating the format converter to change the audio subchannel to match the different sample format.

In some implementations, comparing includes determining that the sink device is configured to output a different number of channels and determining that a source sample rate of the audio subchannel differs from a sink sample rate associated with the new sink device, and further comprising determining whether the channel conversion is up-conversion or down-conversion and configuring the conversion path to set the channel converter after the sample rate converter in the case of up-conversion and to set the channel converter before the sample rate converter in the case of down-conversion.

In some implementations, the method may further include comparing a minimum fragment requirement of the new sink device and priming the PCM buffer within the new sink device with silence prior to the processing input PCM fragment data.

In some implementations, determining that the audio subchannel is to be routed to the new sink device includes determining that a change is made to a routing matrix, wherein the routing matrix maps the routing of audio sources to sink devices.

In some implementations, processing input PCM fragment data includes, for a first audio channel, for each sink devices to which that first audio channel is routed, processing the PCM input fragment data through a conversion path associated with one of the sink devices, and updating a completed bitmap associated with the first audio channel as the input PCM fragment data is added to a sink device PCM buffer, and comparing the completed bitmap to an active sink bitmap to determine when processing of the PCM input fragment data is complete to all active sink devices and, in response, obtaining new input PCM fragment data.

In some implementations, the processing input PCM fragment data is repeated for each sink device in response to receipt an interrupt signal from that sink device indicating that its PCM buffer has capacity for additional data. In some cases, the method may further include tracking the frequency of interrupt signals from each sink device, determining a rolling average consumption rate for each sink device, determining that one of the sink devices is out of sync with another of the sink devices and, in response, adjusting the sample rate converter of said one of the sink devices.

In yet another aspect, the present application describes a computing system that may include a plurality of sink devices for audio playback; one or more processors; and memory storing processor executable instructions that, when executed by the one or more processors, cause the one or more processors to operate a software-based router to dynamically route pulse-code modulated (PCM) audio subchannels to the plurality of sink devices. The instructions, when executed, may configure the software-based router to determine that an audio subchannel is to be routed to a new sink device of the plurality of sink devices; determine that a source fragment size differs from a sink fragment size associated with the new sink device and, as a result, set a pre-conversion buffer within the software-based router; compare characteristics of the audio subchannel to the new sink device and, based on a mismatch, configure a conversion path having one or more of a sample rate converter, a channel converter, or a format converter; and process input PCM fragment data from the audio subchannel into the pre-conversion buffer and through the conversion path to a PCM buffer in the new sink device.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application relates to pulse-code modulated (PCM) audio and, in particular, to the routing of streams of PCM audio to one or more audio devices, i.e. sinks. The audio sinks may include hardware devices capable of outputting audio from a PCM stream, such as a speaker, a headset, or another device containing an audio transducer. The audio sinks may include a hardware device configured to provide an interface for transmitting the audio, such as an HDMI controller or a short-range wireless chip, such as a Bluetooth™ chip. In some cases, the audio sinks may include two or more audio controllers compliant with the Inter-IC Sound ($I^2S$) audio interface standard.

The streams of PCM audio may include one or more streams, which may be referred to herein as "substreams" or "subchannels" in some cases. In one example, a subchannel may originate from one application and another subchannel may originate from another application. The applications may be executing on the same device or on different devices. In one example, a single application may generate more than one subchannel. Example applications may include a music streaming application, a media player, a voice communication application, a gaming application, a navigation application, or any application capable of generating audio, including notifications.

Subchannels of PCM audio may be of different audio types or classes. In some cases, the PCM stream itself is configured to contain an indicator or code signaling its audio type or class. The subchannel may include an audio type descriptor or code signaling its audio type, e.g. audio_type. Different audio types may be predefined, such as "music", "voice", "game", "media", "navigation", "notification", or others.

The description below may refer to a "fragment" or "fragment data" in connection with PCM audio. The terms "fragment" or "fragment data" may be understood to be a unit of PCM data to be processed by a portion of the system. It may be expressed in terms of the number of audio samples or a time period containing multiple audio samples, e.g. 16 ms for instance. Certain applications, playback devices, or processing devices may be configured to handle PCM fragments of a particular size or length.

Reference is now made to FIG. 1, which shows an illustrative diagrammatic example of a vehicle 100 having multiple audio sinks. It will be appreciated that a vehicle is only one example environment in which multiple PCM audio subchannels may be routed to a plurality of possible downstream PCM audio sinks. The present application is not necessarily restricted to implementation in a vehicle.

The example vehicle 100 may include an on-board computing system 102 that includes one or more processing units, memory, and input/output devices. The computing system 102 may be configured to carry out a number of functions related to vehicle operation and management, including user interface functions such as audio controls. The audio functions may include implementation of a software-based PCM router for dynamically routing source audio PCM streams to one or more PCM audio sinks.

Example sinks may include speakers, such as front speakers 104a, 104b, which may be driven by a front speaker driver 106. In some cases, each speaker may have a dedicated speaker driver. In some example cases, a single speaker driver may be configured to drive all available hardware speakers in the vehicle 100. The speakers may include a set of rear speakers 108a. 108b, 108c. 108d driven by a rear speaker driver 110.

The vehicle 100 may be configured to establish a wireless connection with one or more mobile networks 120. The wireless connection may be a mobile wireless connection over 4G, 5G or other wireless connection technology. In some cases, the wireless connection may be over WiFi. The computing system 102 may exchange communications with one or more remote systems over the wireless connection. In some cases, this may include receipt of voice communications, data communications, streamed media, and other such data.

The computing system 102 may include short-range wireless capability enabling to establish a short-range wireless connection with a wireless device, such as headphones, earbuds, or a headset 112 or other such devices. The headset 112 may include speakers for outputting audio and/or a microphone for receiving sound and converting it to digital audio. The wireless connection with the wireless device may include a Bluetooth™ connection or other such short-range wireless connection.

The computing system 102 may be configured for wireless connection to one or more mobile computing devices, such as a smartphone 114. The smartphone 114 may include a plurality of applications capable of generating audio streams. The wireless connection between the smartphone 114 and the computing system 102 may employ Bluetooth™, WiFi, or other short-range communications protocols.

In this example environment, various applications may be generating PCM audio streams. For example, the computing system 102 may include a plurality of applications configured to generate audio streams, including, for instance, a navigation application, a satellite radio application, a media player application, a gaming application, etc. The smartphone 114 may also have a number of applications capable of generating PCM audio streams, at least some of which may be configured to be streamed to the computing system 102 via the wireless connection. Examples may include a messaging application configured for voice communication, a navigation/maps application, a music application, etc. The headset 112 may also be configured to stream audio to the computing system 102 based on microphone input at the headset 112 in some cases. Streamed PCM audio may also be received via the mobile network 120 from one or more remote systems. Accordingly, the computing system 102 may have a plurality of PCM audio subchannels to route.

The computing system 102 may permit the routing of subchannels to one or more of the possible audio sink devices. For example, navigation audio may be streamed to the front speakers 104a, 104b, on the basis that the audio is intended for the driver. Streamed music audio may be sent to all of the speakers 104, 108 in some cases. Voice communication audio may be directed to the headset 112. Gaming audio may be only sent to the rear speakers 108 or to a particular headset jack (not shown) of a particular seat. Notifications from one or more applications may be streamed to be output at all sink devices.

At times, the computing system 102 may be instructed to change streaming to remove or add a subchannel or to begin or stop streaming of a subchannel to a particular one of the audio sinks. Dynamic changes in routing audio can often result in pops and other audio artefacts, and can involve synchronization problems when multiple sinks are involved. Moreover, not all sinks have the same audio requirements and are not capable of receiving and using the same PCM audio stream.

Accordingly, the present application provides for a software-implemented PCM router within the computing system 102 enabling dynamically-configurable 1: n routing of PCM audio subchannels to one or more audio sinks.

Figure 2:
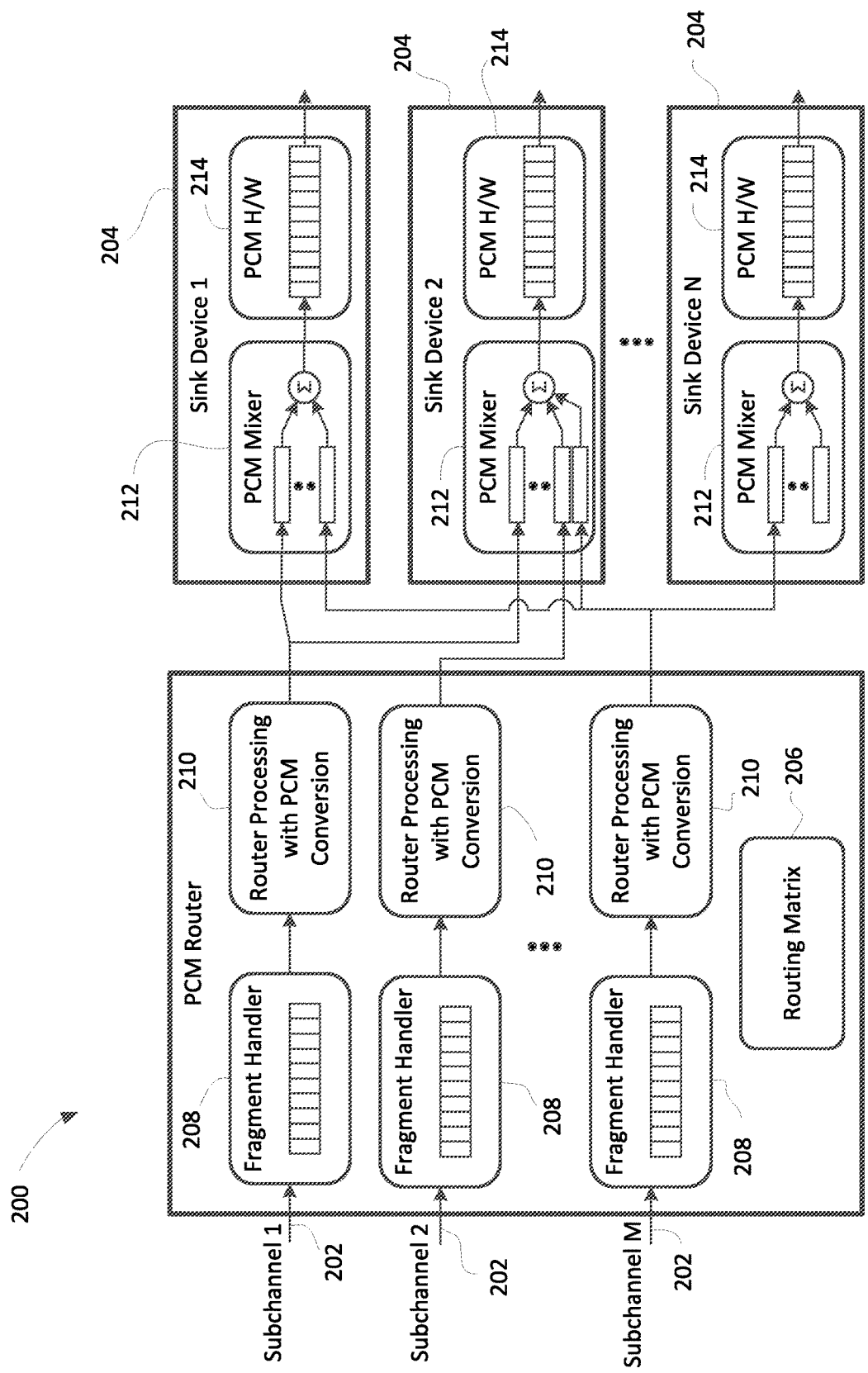
FIG. 2 shows a simplified example of a PCM router.

Reference is now made to FIG. 2, which diagrammatically shows a simplified example of a PCM router 200. The PCM router 200 is implemented in software executed by a computing system, such as the computing system 102 (FIG. 1). The PCM router 200 is configured to route one or more audio subchannels 202 to one or more sink devices 204. Each sink device 204 may receive one subchannel 202, more than one subchannel 202, or no subchannels 202.

The PCM router 200 is configured to carry out the routing based on the setting in a routing matrix 206. The routing matrix 206 may be a data structure stored in memory and mapping active subchannels 202 to sink devices 204. In some cases, the routing matrix 206 may be implemented as a table. In one example, the table may have rows representing the audio sources, i.e. subchannels 202, and columns representing the sink devices 204. In some cases, the table may be a binary map or binary matrix in which each cell includes a binary flag indicating whether the corresponding subchannel 202 of that row is routed to the corresponding sink device 204 of that column.

In some implementations, each subchannel 202 corresponds to an audio_type generated by an application or other audio source. In some cases, a single application or audio source may produce more than one audio_type and, as such, may generate more than one subchannel 202. Audio_types may include, for example, voice, media, notifications, etc.

To implement a routing change, such as to add a new subchannel 202 or to add a sink device 204 to the routing of an existing subchannel 202 or to remove a sink device 204 from the routing of an existing subchannel 202, a change may be made to the routing matrix 206. In some cases, the computing system may detect a change to the routing matrix 206 that triggers action. In some cases, a change to the routing matrix 206 may trigger an interrupt or other signal that causes the computing system to process the routing matrix 206 and implement the changes.

To process the routing matrix 206, in some examples the PCM router 200 may iterate through each subchannel 202, i.e. row, in the routing matrix 206 and, for each subchannel, it may acquire any new sink device 204 specified in the routing matrix 206, stop/drain any sink device 204 currently active that is no longer active in the routing matrix 206, start playback on newly-routed sink devices 204, and release any sink devices that are no longer active.

For each subchannel 202, the PCM router 200 may include a fragment handler 208 and a router processing and PCM conversion path 210. The fragment handler 208 may be configured to obtain a PCM fragment data from a subchannel 202. The PCM fragment data may include a bitstream of PCM data in a size determined by the application generating the subchannel 202. Not all applications use the same fragment length/size. The PCM fragment data may be stored or held in memory by the fragment handler 208 in association with a timestamp. In some cases, the fragment handler 208 may also maintain a bitmap tracking the processing of the fragment vis-à-vis the sink devices 204. The timestamp may be generated by the PCM router 200 or the computing system that implements the PCM router 200 in some cases.

When setting up a subchannel 202 to be routed to one or more sink devices 204, the PCM router 200 configures the router processing and PCM conversion path 210 for that subchannel. When a sink device 204 is added or removed from the routing for a subchannel 202, the then the PCM router 200 modifies the router processing and PCM conversion path 210 to account for the new sink device 204 or removed sink device 204, which may include making changes to the paths leading to other sink devices 204 in some situations.

The router processing and PCM conversion path 210 may include various buffers and/or modules chained together to apply any needed data conversions to the PCM fragment in order for it to be processed by a particular sink device 204. The router processing and PCM conversion path 210 is described in greater detail below.

The fragment handler 208 for a particular subchannel 202 may maintain an active bitmap that reflects the mapping of active sink devices 204 to which that subchannel 202 is to be routed in accordance with the routing matrix 206. The bitmap tracking the processing of the fragment vis-à-vis the sink devices 204 may be referred to as a completed bitmap, as it tracks to which sink devices 204 the PCM router 200 has completed processing and transmission of the current PCM fragment. As processing to a particular sink device 204 is completed, the corresponding bit position of the completed bitmap is updated, e.g. set. Once the completed bitmap matches the active bitmap, then the fragment handler 208 knows that processing of the current fragment data is complete and it may obtain a new PCM fragment for that subchannel 202.

The PCM router 200 has at least one router processing thread that iterates through each fragment handler 208 and, for each fragment handler 208, iterate through each active sink device 204 for that fragment handler 208. Each iteration over an active sink device 204 processes as much PCM data from the fragment handler 208 as may be managed by the sink device 204.

Sink devices 204 may include a PCM mixer 212 for receiving and combining, e.g. multiplexing, PCM fragment data from multiple sources. The sink devices 204 may include PCM hardware 214 for processing the PCM data to output audio. Sink devices 204 may have a PCM input buffer having a size set by the sink device 204. The size of the PCM input buffer may differ from sink device 204 to sink device 204.

The PCM router 200 may be configured to determine and track the size of each sink device's PCM input buffer. In some cases, one of the sink devices 204 may be configured to sent a signal to the PCM router 200 regarding the state of its PCM input buffer. For example, the sink device 204 may send an interrupt signal (sink dma_interrupt) when PCM input buffer space is available or when the PCM input buffer is empty. The PCM router 200 may be responsive to an interrupt signal from the sink device 204 to trigger the processing of further PCM data for that sink device from a fragment handler 208.

Figure 3:
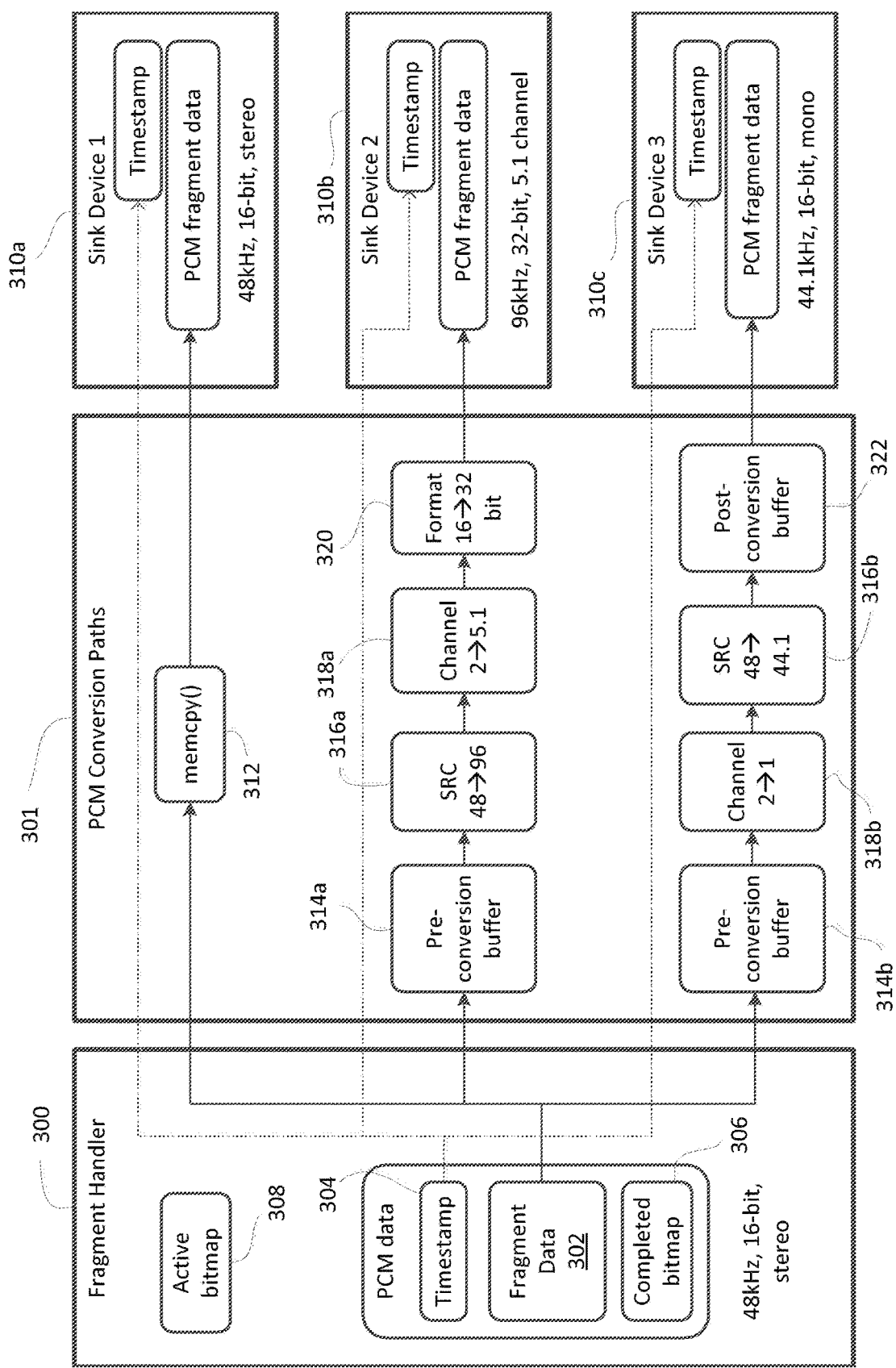
FIG. 3 shows one example of a fragment handler and router processing and PCM conversion path for one subchannel in a PCM router.

Reference is now made to FIG. 3, which shows one example of a fragment handler 300 and router processing and PCM conversion path 301 for one subchannel in a PCM router. In this example, fragment data 302 held in a data structure in memory is associated with a timestamp 304, and a completed bitmap 306. The PCM router further maintains an active bitmap 308 indicating the routing of this subchannel to active sink devices 310 (shown individually as 310a, 310b, 310c).

In this illustrative example, the subchannel provides PCM data having a 48 KHz sample rate, 2-channels (stereo audio), and in 16-bit format. The subchannel is to be routed by the PCM router to three different sink devices 310. The first sink device 310a requires PCM data in a 2-channel, 16-bit format and at a 48 kHz sample rate. Accordingly, no conversion is required for the subchannel. As shown, in some cases, the router processing and PCM conversion path 301 to the first sink device 310a may include a simple copy operation 312. The path may include use of a buffer (not shown) for timing or synchronization purposes in some implementations. It will be noted that the timestamp 304 corresponding to the fragment data 302 is also passed through to the first sink device 310a with the fragment data 302.

The second sink device 310b requires PCM data in a 5.1 channel, 32-bit format with a sample rate of 96 KHz. In this case, the router detects that the sample size and/or sample rate at the second sink device 310b mismatches the sample size and/or sample rate of the fragment data 302 from the audio source. Accordingly, it establishes a router processing and PCM conversion path 301 to the second sink device 310b that includes a pre-conversion buffer 314a in part to handle the misalignment. This allows the router to accumulate fragment data when crossing an unaligned fragment boundary, i.e. if there are not enough remaining bytes in the current fragment data 302 available to complete a processing operation in the router processing and PCM conversion path 301 to the second sink device 310b.

The path to the second sink device 310b includes a sample rate converter (SRC) 316a to convert 48 kHz samples to 96 kHz samples. The path also includes a "voices" converter, i.e. a channel converter 318a, to convert 2 channel audio to 5.1 channel audio and a format converter 320a to upsample the 16-bit format to a 32-bit format. The converted fragment data output from the path to the second sink device 310b is in 5.1 channel, 32-bit format with a sample rate of 96 kHz, thus meeting the needs of the second sink device 310b.

The third sink device 310c requires PCM data in a mono (1 channel), 16-bit format with a sample rate of 44.1 kHz. The router detects that the sample size and/or sample rate at the third sink device 310c mismatches the sample size and/or sample rate of the fragment data 302 from the audio source. Accordingly, it establishes a router processing and PCM conversion path 301 to the third sink device 310c that includes a pre-conversion buffer 314b in part to handle the fragment misalignment. The path further includes a channel converter 318b to convert the stereo audio to mono and an SRC 316b to convert the 48 kHz samples to 44.1 KHz samples. It will be noted that in this case the router inserts the channel converter 318b closer to the beginning of the conversion chain path, before the SRC 316b, based on the fact the path involves down-sampling, whereas with the second sink device 310b its conversion path included the channel converter 318a after the SRC 316a. Advantageously, the router is able to dynamically configure the conversion path for a given sink device based on the nature of the conversions being performed for a particular audio source and sink.

The conversion path to the third sink device 310c further includes a post-conversion buffer 322. A post-conversion buffer 322 may be inserted in cases where the PCM conversion processing does not produce the exact number of bytes as the sink's fixed fragment size. The post-conversion buffer 322 allows for accumulation of post-processed data between processing iterations. With this configuration, partially-converted data is not stored within the path in individual conversion modules. PCM data is always fully processed through the conversion chain on every processing iteration, and any remaining data due to alignment mismatches remains either unprocessed in the pre-conversion buffer 314 or fully-processed in the post-conversion buffer 322. This advantageously may simplify positional accounting and drain handling in the router.

Format conversion may include any differences in sample format, including number of bits per sample, signed versus unsigned, differences in sample format (float, mu-law, A-law, etc.), or any other sample format differences.

Another advantage of a software-based router is the use of dynamic buffer sizing. When a new subchannel is added the router may determine a minimum buffer size. That is, the router may be configured to determine, for each sink device to which a subchannel is to be routed, the minimum fragment period, the maximum fragment period, and the minimum number of fragments supported by each sink device. Based on this data and the source format, the router may set its own PCM buffer sizing within the fragment handler, the PCM conversion path, and/or the buffer sizing within the sink devices. The buffer size may be set based on the minimum fragment size and minimum number of fragments acceptable to all sink devices so as to minimize latency and memory footprint.

Figure 4:
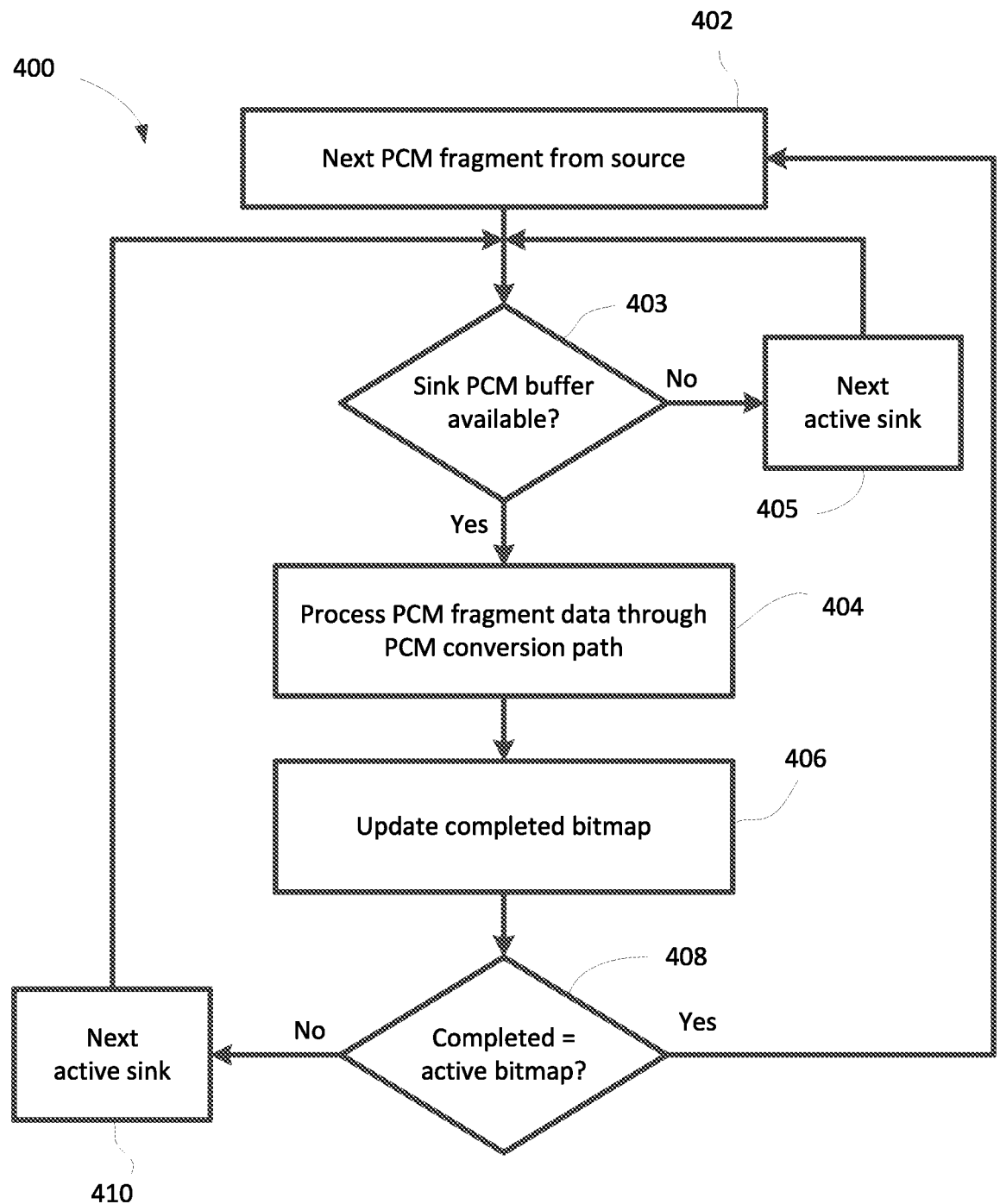
FIG. 4 shows, in flowchart form, an example method of dynamically routing a subchannel of PCM audio to a plurality of sink devices.

Reference is now made to FIG. 4, which shows, in flowchart form, an example method 400 of dynamically routing a PCM subchannel of audio to a plurality of sink devices. The method 400 may be implemented by processor-executable instructions stored in memory in conjunction with one or more processors that, when executing the instructions, carry out the described operations. The method 400 may be implemented by one or more software modules or applications configured to execute on a computing device so as to implement a PCM router, as described herein.

The method 400 presumes the instantiation of the PCM router and a fragment handler for a particular subchannel of audio from an audio source. The method 400 further presumes that the PCM router has been configured to route the subchannel to one or more sink devices, and that the PCM router has configured router processing and a PCM conversion path to each of the one or more sink devices based on their respective characteristics.

In operation 402, the PCM router and, in particular, the fragment handler, obtains fragment data from the source. This may include obtaining a next fragment from the source. In some cases, it may include obtaining more than one fragment, i.e. a fragment period that includes two or more fragments from the source. The number of fragments obtained may be partly dependent on the size of internal buffers in the PCM router, for example in the fragment handler.

In operation 403, the PCM router assesses whether the first sink device has available PCM buffer space. If the PCM conversion path for that sink device includes a post-conversion buffer, then operation 403 may include assessing whether there is capacity in the post-conversion buffer. If so, then the PCM router moves to operation 404 to initiate processing of the fragment data through that conversion path to the first sink device. But if the PCM router determines that there is insufficient buffer capacity to accept processed PCM data, then it skips to the next sink device, as indicated by operation 405 to see if it has capacity to accept processed PCM data. If a sink does not yet have capacity, the PCM router moves to the next sink and will eventually cycle back to the skipped sink. In operation 404, the PCM router initiates processing of the fragment PCM data through a first one of the respective PCM conversion chains to the first sink device.

In operation 406, the PCM router updates the "completed" bitmap associated with the fragment data to signal completed processing of that fragment data with regard to one of the sink devices. The completed bitmap may, in some embodiments, include a bit associated with each sink device. The bit value at each bit position in the bitmap signals whether processing of the associated fragment data for that sink device has been completed. As processing is completed of fragment data for the conversion path to a particular one of the sink devices, the PCM router then sets the bit associated with that sink device.

In operation 408, the PCM router compares the updated completed bitmap with the active bitmap. The active bitmap similarly maps bit positions to sink devices. Bits that are set correspond to active sink devices, such that the active bitmap signals to which sink devices the subchannel is currently being routed. When the completed bitmap matches the active bitmap, then the current fragment data has been processed and sent to all the currently active sink devices. If they do not match, then the PCM router cycles to the next active sink device in operation 410 and returns to operation 404 to continue processing the current fragment data through its router processing and PCM conversion path.

When the PCM router cycles to the next active sink device in operation 410 or in operation 405, it may skip those sink devices to which the current fragment data has already been processed and sent. After having iterated through all the active sink devices, the PCM router may return to any active sink devices that it initially skipped because of insufficient buffer capacity to see if they now have capacity to accept processed PCM data.

Once the active bitmap and completed bitmap match, as determined in operation 408, then the PCM router may acquire the next fragment data from the source and begin the process again.

Figure 5:
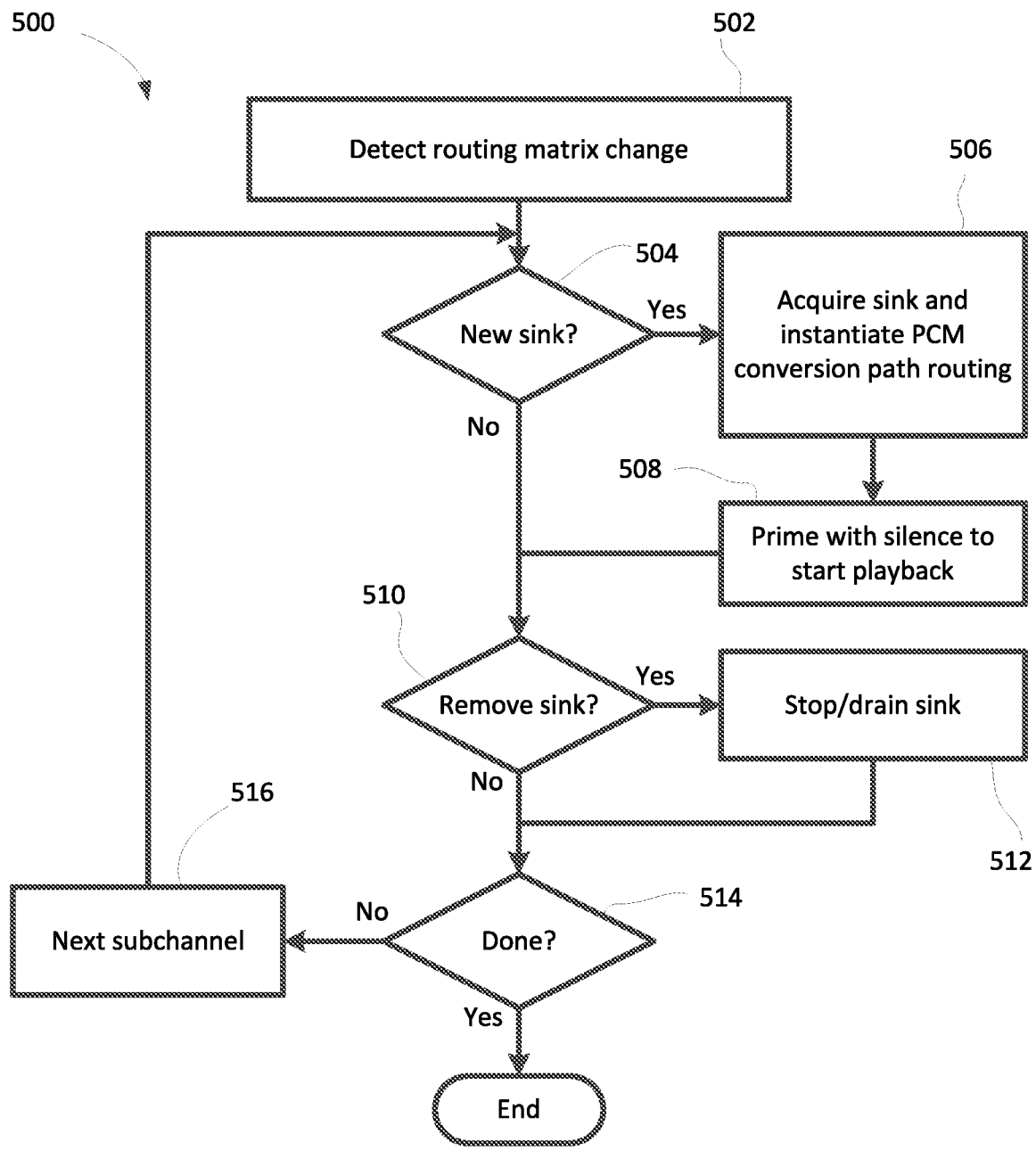
FIG. 5 shows a simplified example method of dynamically changing routing within a PCM router.

Reference will now be made to FIG. 5, which shows a simplified example method 500 of dynamically changing routing within the PCM router. The method 500 may be implemented by processor-executable instructions stored in memory in conjunction with one or more processors that, when executing the instructions, carry out the described operations. The method 500 may be implemented by one or more software modules or applications configured to execute on a computing device so as to implement a PCM router, as described herein.

The PCM router may implement dynamic routing of audio sources, e.g. PCM subchannels, to various respective audio sink devices. In some examples, the mapping of sources to sinks may be implemented using a routing matrix. In its simplest implementation the routing matrix may be a data structure, such as bitmap, having a row or other data structure division allocated to each available source, e.g. to each audio subchannel. In some cases, the subchannels are associated with an audio type, such that more than one subchannel may originate from the same application or other source. For example, an application may generate both alerts/notifications and music, each of which may be treated as a separate subchannel.

In an example in which each subchannel has a respective row in the routing matrix, each possible sink device may have an associated column, such that each cell corresponds to a respective source and sink. In a bitmap example, each cell may contain a binary flag signaling whether that source is to be routed to that sink or not. In some cases, a single source may have multiple different audio types and each audio type from that source may have its own row as a distinct subchannel to be routed.

The addition or removal of sources and/or changes in routing of sources to sinks may be carried out through a user interface (not shown). In one example, in the context of a vehicle with multiple sink devices, a user interface on the dashboard panel may provide for the options of changing the routing of various audio sources to various sink devices. As an illustration, the audio system interface may permit the selective routing of an audio source, such as satellite radio, to one or more of various speaker groups, e.g. front speakers, rear speakers, head rest speakers, audio jacks, etc. Changes implemented through a user interface cause a change in the routing matrix maintained by the PCM router.

In operation 502, the PCM router may detect a change in the routing matrix that triggers initiation of the method 500 to implement the change in routing. The PCM router may be configured to cycle through each subchannel in the routing matrix to assess whether that subchannel is newly added and/or whether the routing of that subchannel to any sink devices has changed, i.e. whether the subchannel is to be routed or to cease being routed to a particular sink device. In operation 504, the PCM router may assess whether the routing matrix indicates that a particular subchannel is to be routed to a new sink device. In this sense the sink device is "new" in that it the subchannel was not already being routed to that sink device; it does not imply that the sink device has been newly-added to the audio system such as by connecting a USB audio device or the like.

If a new sink has been added the PCM router acquires the sink device and its characteristics and instantiates a router processing and PCM conversion path to that sink device. As noted above, this may include comparing the PCM source characteristics to the sink device characteristics and, in particular, the format, sample rate and number of channels. The PCM conversion path instantiation may include creating a pre-conversion buffer, a channel converter, an SRC, and/or a post-conversion buffer depending on the mismatch, if any, between the source PCM characteristics and the sink PCM requirements.

The PCM router may also, in some cases, reevaluate the minimum PCM buffer sizing based on addition of the new sink device. The minimum PCM fragment period and/or fragment size for the sink device may be compared to the source PCM characteristics and/or the characteristics of other active sink devices for that subchannel to determine whether any changes are required to minimum PCM buffer sizing. In some instances, however, the reassessment of buffer sizing only occurs upon release and reacquisition of a subchannel. At that point, the system may evaluate all available sink devices and determine a suitable buffer sizing. If a new sink device is added to the system following the previous acquisition of the subchannel, releasing and reacquiring the subchannel may be a mechanism for forcing the reevaluation of buffer sizing. Even if the newly-added sink device is not part of the current routing of the subchannel, performing the reevaluation and sizing buffers appropriately may permit seamless routing changes to the newly-added sink device in the future. Forced release and reacquisition of the subchannel may be deemed to disruptive of ongoing playback in some implementations and newly-added sink devices may not be made available to active subchannels in some instances without a manual stopping of playback.

When a sink device is first started, the PCM router primes its PCM buffers to meet minimum fragment requirements to prevent a buffer underrun on start. The buffer priming effectively instantly consumes data to reach its minimum fragment requirements at which point the consumption rate will drop to the audio rate as the sink generates interrupts back to the PCM router to signal its capacity for further PCM data. When a new subchannel is added and routed to multiple sink devices, all sink devices may have their buffers primed with PCM data from the subchannel's PCM buffer within the PCM router since all sink devices will go through this instant initial consumption at the same time and will stay at the same relative offset into the subchannel's PCM buffer.

When a new sink device is added to an existing subchannel, this instant consumption issue is handled differently by the PCM router. The newly-added sink device has its PCM buffer primed with silence to avoid instant consumption of PCM data from the subchannel's PCM buffer, which could result in a synchronization issue with other running sink devices and associated audible artefacts. Once the newly-added sink device has its PCM buffers primed with silence, and it gets through its initial consumption, then it will revert to regular audio rate consumption from the subchannel's PCM buffer and will start receiving data using the same offset as other active sink devices.

In operation 510, the PCM router may determine whether a sink device has been removed, i.e. whether the matrix signals that a subchannel has been removed and/or whether a subchannel is no longer to be routed to a particular sink device. If so, then in operation 512, the PCM router takes steps to stop/drain the sink device. A drain request is issued to stop a playback stream when all buffered PCM data has been played out to the sink device(s). If there are partial fragments maintained in the pre-conversion and/or post-conversion buffers within the PCM conversion path to a particular sink device, the PCM router may silence pad those fragments to complete processing of all data out to the sink devices.

The silence padding may occur in two passes through the conversion chain in some implementations. If the pre-conversion buffer includes a partial fragment, i.e. less than the conversion block processing size for that path, then the fragment data will be silence extended to a full block to allow the data to be processed through the full PCM conversion path. If a post-conversion buffer includes a partial fragment, i.e. less than the sink device's fragment size, then that data is silence extended to a full sink device fragment and copied to the sink device's input PCM buffer. In some cases, priming a buffer with silence may include priming the buffer with zeros or whatever other data pattern corresponds to silence in a given implementation.

In operation 514, the PCM router may assess whether it has completed analysis of the changes to the routing matrix, i.e. whether it has cycled through all subchannels and dealt with any new sinks or removed sinks. If not, then it may move to the next subchannel in operation 516 and return to operation 504 to process any changes to that subchannel's routing.

Figure 6:
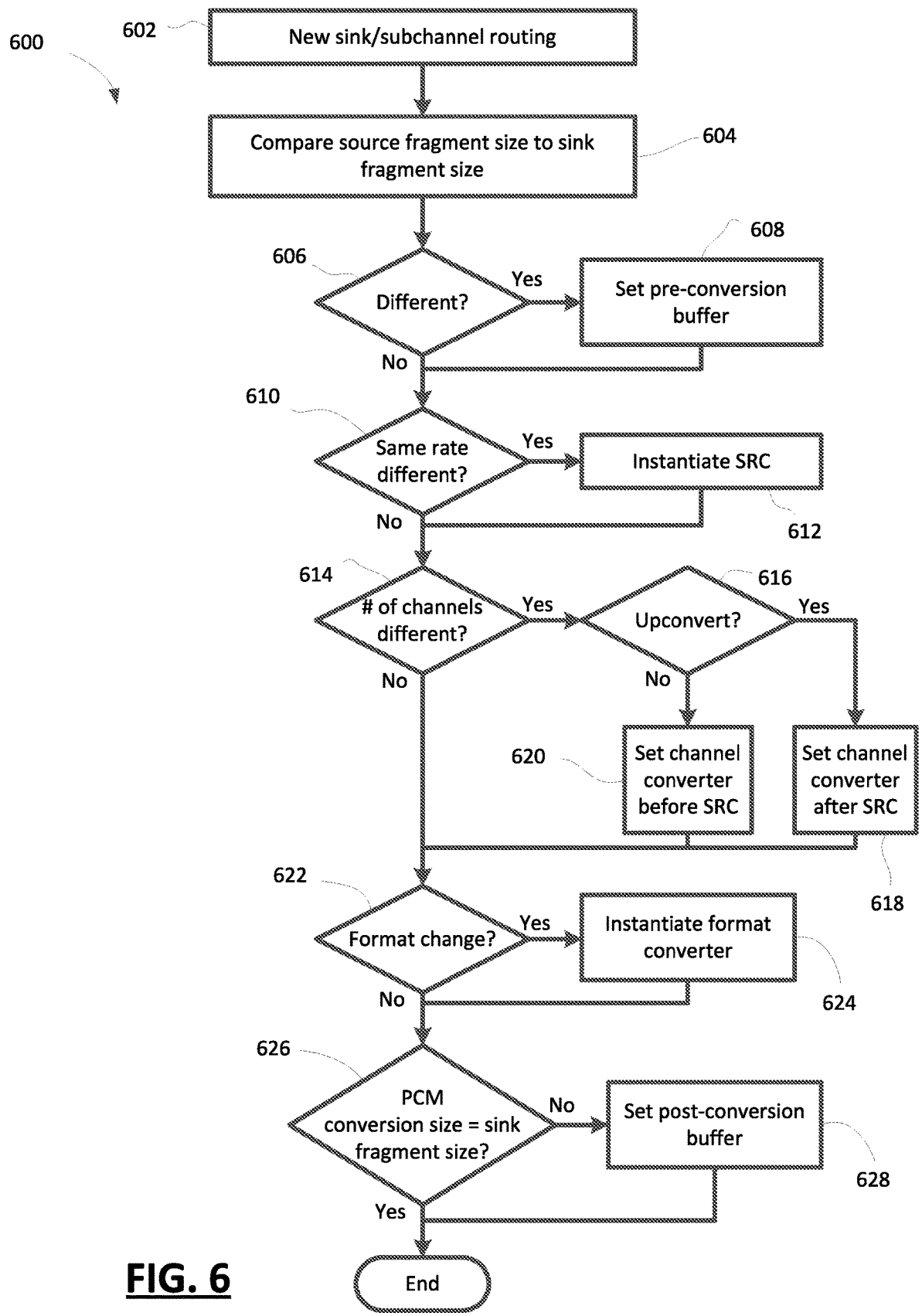
FIG. 6 shows, in flowchart form, one example method for instantiating a PCM conversion path within the PCM router.

FIG. 6 shows, in flowchart form, one example method 600 for instantiating a PCM conversion path within the PCM router. The method 600 may be triggered or initiated based on a new subchannel being added or based on a change in subchannel routing to a new sink device, as indicated by operation 602. In either case, the sink device is referred to below as a "newly-added" sink device. The PCM router obtains details of the sink device parameters and the source subchannel parameters, including, for example, fragment parameters like fragment size, number of channels, sample rate, and format.

In operation 604, the PCM router may compare subchannel fragment parameters associated with the PCM source with fragment parameters associated with the sink device. This may, in some cases, include comparing the fragment parameters with minimum or maximum fragment parameters associated with already active sink devices to which the subchannel is being routed. The fragment parameters may include, for example, a fragment size, a minimum or maximum number of fragments in the PCM buffer, or other such parameters.

In operation 606, the PCM router may determine whether the newly-added sink device has a fragment size different from the source subchannel fragment size. If so, then in operation 608, the PCM router may set a pre-conversion buffer for the path to the newly-added sink device.

In operation 610, the PCM router may determine whether the sample rate of the subchannel differs from the sample rate used by the sink device. If different, then the PCM router may instantiate a sample rate converter (SRC) in operation 612 to convert the subchannel samples to sink device samples at the sink device sample rate.

In operation 614, the PCM router may determined whether the number of channels from the subchannel is different from the number of channels expected by the sink device. If so, then it assesses whether the conversion needed is up-conversion to create additional channels or down-conversion to reduce the number of channels. If up-conversion is to be implemented, then the PCM router instantiates a channel converter after the SRC (if any) in the conversion path, as indicated by operation 618. If down-conversion is to be implemented, then the PCM router instantiates a channel converter before the SRC (if any) in the conversion path, as indicated by operation 620.

The PCM router may then determine whether a format change is required in operation 622. In this context a "format" change refers to the number of bits per sample. If a conversion is required, then in operation 624 the PCM router instantiates a format converter in the conversion path.

The PCM router may also then determine whether the resultant PCM conversion path produces a number of bytes aligning with the sink device's fixed fragment size, as indicated by operation 626. If there is a misalignment between the number of bytes produced from the PCM conversion path and the fixed fragment size of the sink device, then in operation 628 the PCM router may instantiate a post-conversion buffer to hold any fully-processed PCM data remaining due to alignment mismatches at each processing iteration.

It will be appreciated that various operations of the method 600 may be performed in a different order or partly in parallel without impacting the overall functioning of the method.

In some implementations, once sink devices are in the running state they may drift out of sync with each other due to small differences in their respective clock domains. To maintain synchronization during playback, the PCM router may make adjustments to one or more of the SRC conversion ratios to account for clock drift. In one example, the PCM router may designate one of the sink devices as a clock master and all other sink devices may be slaved to the clock master in terms of consumption rate. Sink interrupt rates may be tracked by the PCM router for each sink device, and the PCM router may computer a rolling average consumption rate of each sink device based on the timing and frequency of its sink interrupt rate. The SRCs of one or more of the conversion paths may be adjusted by the PCM router to alter the consumption rates of slave sink devices so as to match the master sink device's consumption rate. Each time there is a change in routing, the PCM router may be configured to re-evaluate the selection of the clock master designation. If a clock master sink device is removed from the routing, another of the sink device is to be designated as the clock master. If a new device is added, the PCM router may be configured to automatically make it a slave device or may, in some cases, re-assess which device will serve as the clock master.

In some implementations, an asynchronous sample rate converter (ASRC) may be used to synchronize sinks in different clock domains. The router may designate a first active sink device as the master device and all other sinks may be designated as clock slaves. If the clock master sink device is removed from the routing, then the next active sink device may be designated as the clock master device. If all sink devices are in the same clock domain then router may forego designating master/slave devices and may forego instantiating an ASRC.

An example computing device will now be described with reference to FIG. 7, which shows a simplified high-level block diagram of an example computing device 700. The example computing device 700, which may be an onboard computing system within a vehicle in some examples, includes a variety of modules. For example, as illustrated, the example computing device 700 may include a processor 710, a memory 720, a communications module 730, and/or an I/O module 750 and/or a storage module 740. As illustrated, the foregoing example modules of the example computing device 700 are in communication over a bus 760.

The processor 710 is or includes a hardware processor and may, for example, be or include one or more processors using ARM, x86, MIPS, or PowerPC™ instruction sets. For example, the processor 710 may be or include Qualcomm™ Snapdragon™ processors, Intel™ Core™ processors, or the like.

The memory 720 may include random access memory, read-only memory, persistent storage such as, for example, flash memory, a solid-state drive or the like. Read-only memory and persistent storage are a computer-readable medium and, in particular, may be considered examples of non-transitory computer-readable storage media. A computer-readable medium may be organized using a file system such as may be administered by an operating system governing overall operation of the example computing device 700.

The communications module 730 allows the example computing device 700 to communicate with other computing devices and/or various communications networks. For example, the communications module 730 may allow the example computing device 700 to send or receive communications signals. Communications signals may be sent or received according to one or more protocols or according to one or more standards. For example, the communications module 730 may allow the example computing device 700 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 730 may allow the computing device 700 to communicate via Wi-Fi™, using Bluetooth™ or via some combination of one or more networks or protocols. All or a portion of the communications module 730 may be integrated into a component of the example computing device 700. For example, the communications subsystem may be integrated into a communications chipset.

The I/O module 750 provides for input to and output from the example computing device 700. The I/O module 750 may be coupled to and/or in communication with one or more input or output devices. For example, the I/O module 750 may serve to couple the example computing device 700 to at least one microphone and/or at least one speaker and/or associated drivers, either directly or indirectly such, as for example, through suitable analog and/or digital electronics such as, for example, an amplifier, a pre-amplifier, one or more filters, etc. In a particular example, the I/O module 750 may include or may be in communication with an analog-to-digital convertor (ADC) and/or a digital-to-analog convertor (DAC) such as may allow analog audio signals to be converted digital audio signals and vice-versa, respectively.

The storage module 740 allows the example computing device 700 to store and retrieve data. In some embodiments, the storage module 740 may be formed as a part of the memory 720 and/or may be used to access all or a portion of the memory 720. Additionally, or alternatively, the storage module 740 may be used to store and retrieve data from persisted storage other than the persisted storage (if any) accessible via the memory 720. In some embodiments, the storage module 740 may be used to store and retrieve data in a database. A database may be stored in persisted storage. Additionally, or alternatively, the storage module 740 may access data stored remotely such as, for example, as may be accessed using a local area network (LAN), wide area network (WAN), personal area network (PAN), and/or a storage area network (SAN). In some embodiments, the storage module 740 may access data stored remotely using the communications module 730. In some embodiments, the storage module 740 may be omitted and its function may be performed by the memory 720 and/or by the processor 710 in concert with the communications module 730 such as, for example, if data is stored remotely. The storage module 740 may also be referred to as a data store.

Software comprising instructions is executed by the processor 710 from a computer-readable medium. For example, software may be loaded into random-access memory from persistent storage of the memory 720. Additionally or alternatively, instructions may be executed by the processor 710 directly from read-only memory of the memory 720.

Figure 7:
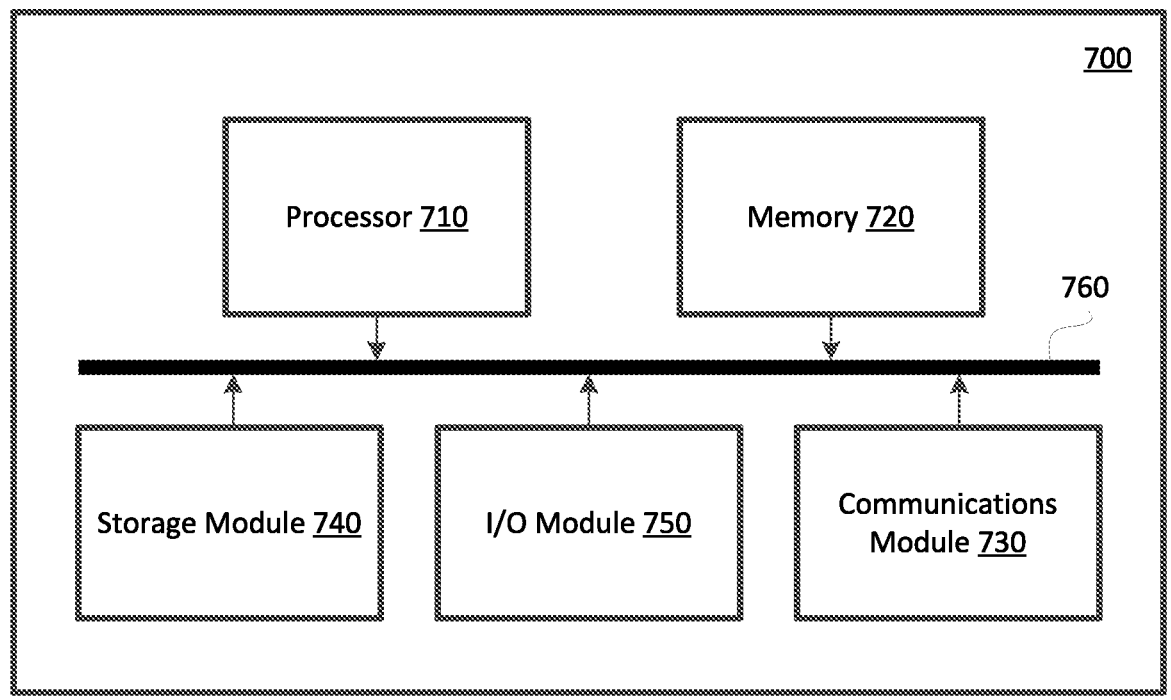
FIG. 7 shows a simplified high-level block diagram of an example computing device.
Figure 8:
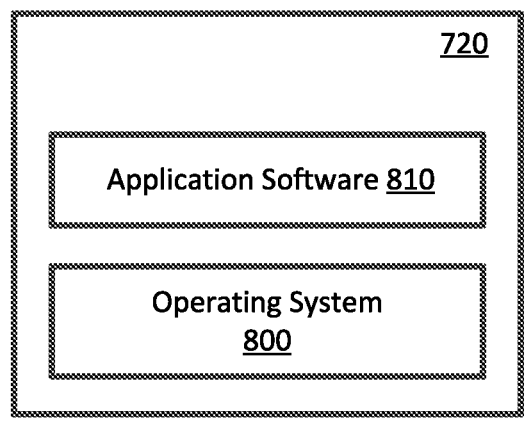
FIG. 8 shows a simplified organization of software components in an example computing device.

FIG. 8 depicts a simplified organization of software components stored in the memory 720 of the example computing device 700 (FIG. 7). As illustrated these software components include an operating system 800 and an application 810.

The operating system 800 comprises software and may comprise, for example, software such as, for example, QNX™, Android™, Linux™, Apple™ iOS™, Microsoft™ Windows™, or the like. The operating system 800 controls the overall operation of the example computing device 700 (FIG. 7) and allows the application 810 to access the processor 710 (FIG. 7), the memory 720, the communications module 730, and the I/O module 750.

The application 810, comprises software that, in combination with the operating system 800, adapts the example computing device 700 (FIG. 7) to operate as a device for various purposes. For example, the application 810 may cooperate with the operating system 800 to adapt the example computing device 700 to implement a software-based PCM router to enable dynamic routing of PCM audio sources to PCM sink devices, as described above.

It will be appreciated that it may be that some or all of the above-described operations of the various above-described example methods may be performed in orders other than those illustrated and/or may be performed concurrently without varying the overall operation of those methods. It will also be appreciated that some or all of the above-described operations of the various above-described example methods may be performed in response to other above-described operations.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

Certain adaptations and modifications of the described embodiments can be made. Therefore, the above discussed embodiments are considered to be illustrative and not restrictive.

What is claimed is:

1. A computer-implemented method of dynamically routing pulse-code modulated (PCM) audio subchannels to one or more sink devices using a software-based router, the method comprising:
   determining that an audio subchannel is to be routed to a new sink device;
   determining that a source fragment size differs from a sink fragment size associated with the new sink device and, as a result, setting a pre-conversion buffer within the software-based router;
   comparing characteristics of the audio subchannel to characteristics of the new sink device and, based on a mismatch, configuring a conversion path having one or more of a sample rate converter, a channel converter, or a format converter;
   priming a PCM buffer within the new sink device with silence, in response to the new sink device being added to the audio subchannel; and
   processing input PCM fragment data from the audio subchannel into the pre-conversion buffer and through the conversion path to the PCM buffer.

2. The computer-implemented method of claim 1, wherein comparing includes determining that a source sample rate of the audio subchannel differs from a sink sample rate associated with the new sink device, and wherein configuring the conversion path includes instantiating the sample rate converter to convert the sample rate of the audio subchannel to match the sink sample rate.

3. The computer-implemented method of claim 1, wherein comparing includes determining that the new sink device is configured to output a different number of channels than a number of channels that the audio subchannel supplies, and wherein configuring the conversion path includes instantiating the channel converter to convert the audio subchannel to the different number of channels.

4. The computer-implemented method of claim 1, wherein comparing includes determining that the new sink device is configured to process a different sample format than a sample format that the audio subchannel provides, and wherein configuring the conversion path includes instantiating the format converter to change the audio subchannel to match the different sample format.

5. The computer-implemented method of claim 1, wherein comparing includes determining that the new sink device is configured to output a different number of channels and determining that a source sample rate of the audio subchannel differs from a sink sample rate associated with the new sink device, and further comprising determining whether a channel conversion is up-conversion or down-conversion and configuring the conversion path to set the channel converter after the sample rate converter in the case of up-conversion and to set the channel converter before the sample rate converter in the case of down-conversion.

6. The computer-implemented method of claim 1, further comprising comparing a minimum fragment requirement of the new sink device, wherein the priming the PCM buffer within the new sink device with silence occurs prior to the processing the input PCM fragment data.

7. The computer-implemented method of claim 1, wherein determining that the audio subchannel is to be routed to the new sink device includes determining that a change is made to a routing matrix, wherein the routing matrix maps the routing of audio sources to sink devices.

8. The computer-implemented method of claim 1, wherein processing input PCM fragment data includes, for a first audio channel, for each sink device to which the first audio channel is routed,
processing the PCM input fragment data through a conversion path associated with one of the one or more sink devices, and
updating a completed bitmap associated with the first audio channel as the input PCM fragment data is added to a sink device PCM buffer, and
comparing the completed bitmap to an active sink bitmap to determine when processing of the PCM input fragment data is complete to each active sink device and, in response, obtaining new input PCM fragment data.

9. The computer-implemented method of claim 1, further comprising processing input PCM fragment data for another sink device in response to receiving an interrupt signal from the other sink device indicating that a PCM buffer of the other sink device has capacity for additional data.

10. The computer-implemented method of claim 9, further comprising tracking a frequency of interrupt signals from each sink device, determining a rolling average consumption rate for each sink device, determining that a first sink device of the one or more sink devices is out of sync with a second sink device of the one or more sink devices and, in response, adjusting a sample rate converter of the first sink device.

11. A computing system comprising:
a plurality of sink devices for audio playback;
one or more processors; and
memory storing processor executable instructions that, when executed by the one or more processors, cause the one or more processors to operate a software-based router to dynamically route pulse-code modulated (PCM) audio subchannels to the plurality of sink devices and configure the software-based router to:
determine that an audio subchannel is to be routed to a new sink device of the plurality of sink devices;
determine that a source fragment size differs from a sink fragment size associated with the new sink device and, as a result, set a pre-conversion buffer within the software-based router;
compare characteristics of the audio subchannel to characteristics of the new sink device and, based on a mismatch, configure a conversion path having one or more of a sample rate converter, a channel converter, or a format converter;
prime a PCM buffer within the new sink device with silence, in response to the new sink device being added to the audio subchannel; and
process input PCM fragment data from the audio subchannel into the pre-conversion buffer and through the conversion path to the PCM buffer.

12. The computing system of claim 11, wherein the instructions, when executed cause the software-based router to compare by determining that a source sample rate of the audio subchannel differs from a sink sample rate associated with the new sink device, and wherein the instructions, when executed are to cause the software-based router to configure the conversion path by instantiating the sample rate converter to convert the sample rate of the audio subchannel to match the sink sample rate.

13. The computing system of claim 11, wherein the instructions, when executed cause the software-based router to compare by determining that the new sink device is configured to output a different number of channels than a number of channels that the audio subchannel supplies, and wherein the instructions, when executed are to cause the software-based router to configure the conversion path by instantiating the channel converter to convert the audio subchannel to the different number of channels.

14. The computing system of claim 11, wherein the instructions, when executed cause the software-based router to compare by determining that the new sink device is configured to process a different number of bit per sample than a number of bit per sample that the audio subchannel provides, and wherein the instructions, when executed cause the software-based router to configure the conversion path by instantiating the format converter to change the audio subchannel to match the different number of bits per sample.

15. The computing system of claim 11, wherein the instructions, when executed cause the software-based router to compare by determining that the new sink device is configured to output a different number of channels and determining that a source sample rate of the audio subchannel differs from a sink sample rate associated with the new sink device, and further by determining whether a channel conversion is up-conversion or down-conversion and configuring the conversion path to set the channel converter after the sample rate converter in the case of up-conversion and to set the channel converter before the sample rate converter in the case of down-conversion.

16. The computing system of claim 11, wherein the instructions, when executed cause the software-based router to compare a minimum fragment requirement of the new sink device and to prime the PCM buffer within the new sink device with the silence prior to the processing the input PCM fragment data.

17. The computing system of claim 11, wherein the instructions, when executed cause the software-based router to determine that the audio subchannel is to be routed to the new sink device by determining that a change is made to a routing matrix, wherein the routing matrix maps the routing of audio sources to sink devices.

18. The computing system of claim 11, wherein the instructions, when executed cause the software-based router to process input PCM fragment data by, for a first audio channel,
for each sink device to which that first audio channel is routed,
processing the PCM input fragment data through a conversion path associated with one of the plurality of sink devices, and
updating a completed bitmap associated with the first audio channel as the input PCM fragment data is added to a sink device PCM buffer, and
comparing the completed bitmap to an active sink bitmap to determine when processing of the PCM input fragment data is complete to all each active sink device and, in response, obtaining new input PCM fragment data.

19. The computing system of claim 11, wherein the instructions, when executed cause the software-based router to process input PCM fragment data for another sink device in response to receiving an interrupt signal from the other sink device indicating that a PCM buffer of the other sink device has capacity for additional data.

20. The computing system of claim 19, wherein the instructions, when executed further cause the software-based router to track a frequency of interrupt signals from each sink device, determine a rolling average consumption rate for each sink device, determine that a first sink device of the plurality of sink devices is out of sync with a second sink device of the plurality of sink devices and, in response, adjust a sample rate converter of the first sink device.

* * * * *